Nov. 17, 1970  A. A. AKIN, JR  3,540,792

RAPID-FOCUS BINOCULAR

Filed Jan. 2, 1968  5 Sheets-Sheet 1

INVENTOR.
ALFRED A. AKIN, JR.
BY
Christie, Parker & Hale
ATTORNEYS.

Nov. 17, 1970           A. A. AKIN, JR              3,540,792
                    RAPID-FOCUS BINOCULAR
Filed Jan. 2, 1968                          5 Sheets-Sheet 2

INVENTOR.
ALFRED A. AKIN, JR.
BY
Christie, Parker & Hale
ATTORNEYS.

Nov. 17, 1970     A. A. AKIN, JR     3,540,792
RAPID-FOCUS BINOCULAR
Filed Jan. 2, 1968     5 Sheets-Sheet 3
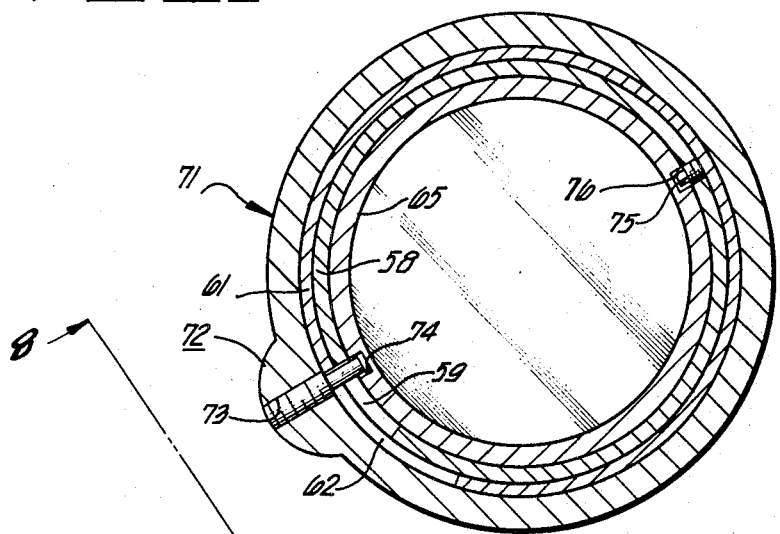
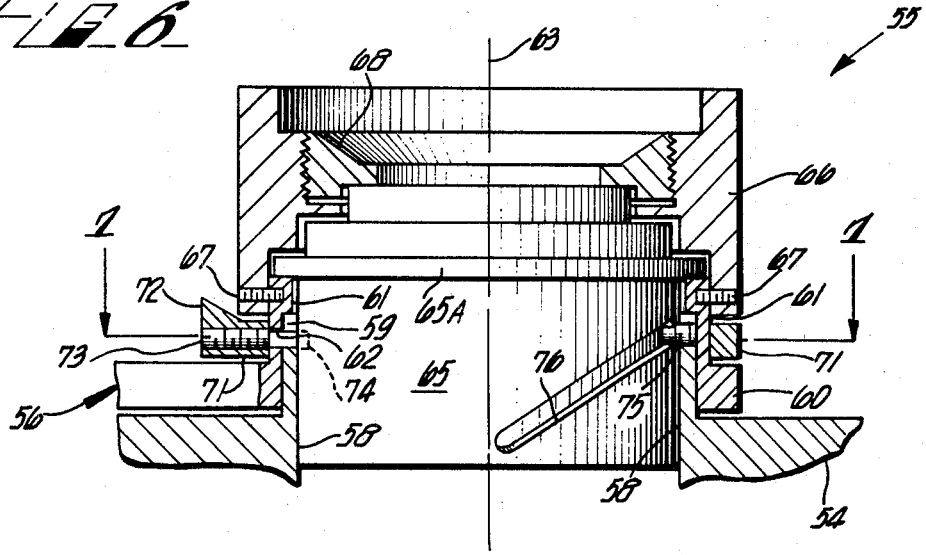
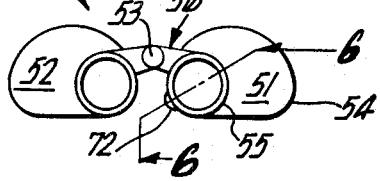
INVENTOR.
ALFRED A. AKIN, JR.
BY
Christie, Parker & Hale
ATTORNEYS.

INVENTOR.
ALFRED A. AKIN, JR.
BY Christie, Parker & Hale
ATTORNEYS.

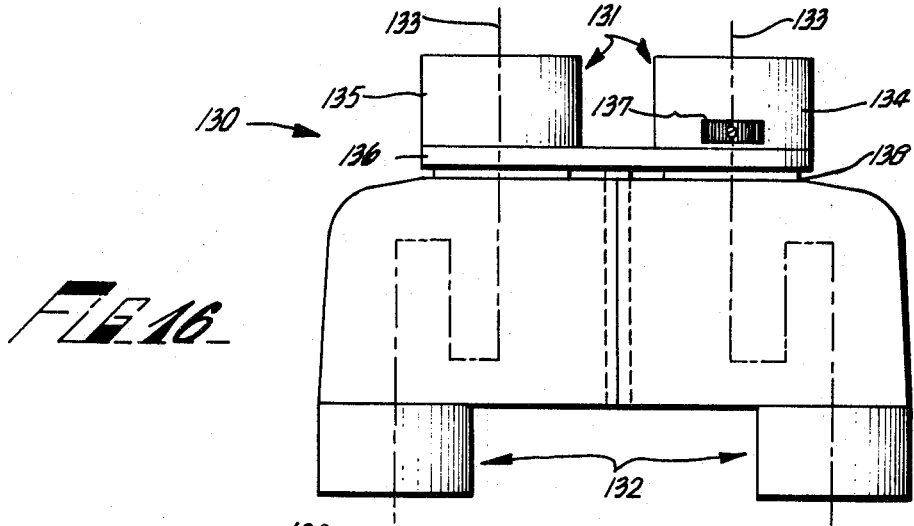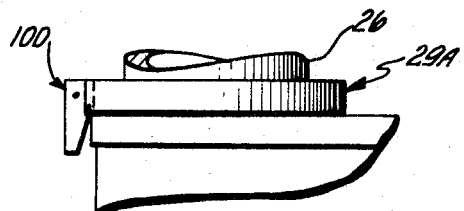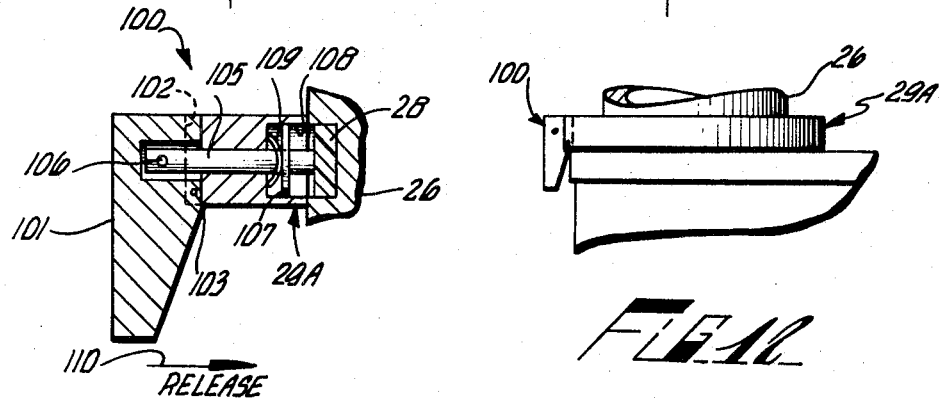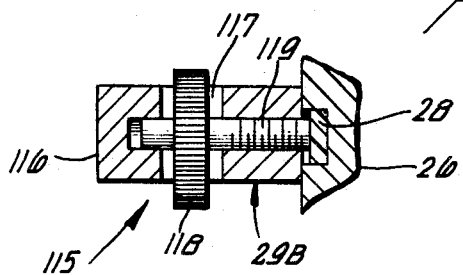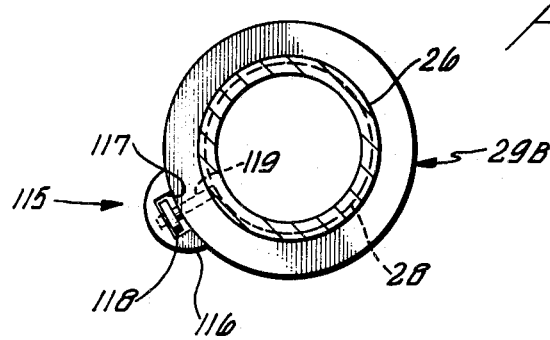

United States Patent Office

3,540,792
Patented Nov. 17, 1970

3,540,792
RAPID-FOCUS BINOCULAR
Alfred A. Akin, Jr., 1435 E. Verness St.,
West Covina, Calif. 91790
Filed Jan. 2, 1968, Ser. No. 695,190
Int. Cl. G02b 7/06
U.S. Cl. 350—77                                   2 Claims

ABSTRACT OF THE DISCLOSURE

An improved binocular having a focus-adjusting ring mounted on an ocular-lens housing to be rotatable about an optical axis of the lens and adapted to adjust both optical systems of the binocular simultaneously. A knob on the adjusting ring is positioned to fall comfortably under the user's thumb, and a short rotational stroke of the ring moves the optical systems rapidly through a full focusing range. A releasable lock is provided on the ring to prevent inadvertent loss of a desired focus setting.

BACKGROUND OF THE INVENTION

Conventional bincoulars have several different types of adjustments to focus on objects at different distances and to accommodate the varying visual characteristics of different users. One style of binocular includes two ocular lenses or eyepieces which are individually rotatable for focusing. This style is slow and awkward to use as two separate adjustments must be made each time the range of the observed object changes.

A more efficient focusing adjustment is found in so-called center-focusing binoculars which have a wheel centrally mounted between two spaced bodies which hold a pair of objective-lens systems (and typically a pair of mirror or prism systems). The wheel is coupled by a bridge member to two ocular-lens housings slidably mounted in the respective objective-lens bodies. Rotation of the wheel causes the ocular-lens housings to move as a unit toward and away from the bodies such that simultaneous focusing of both halves of the bincoular is possible when the range of the observed object changes. One of the ocular lenses is also individually adjustable to permit compensation for the eye characteristics of the user.

Center-focus binoculars are widely used, but have several inherent problems which make them inconvenient to adjust. Binoculars typically have objective lenses with diameters of about 30 to 50 millimeters, and the bodies which house these lenses and associated mirror or prism systems are relatively large. Most users hold a binocular with both hands over the objective bodies and the fingers extending toward the central focus wheel. This wheel, however, is usually out of reach unless one hand is shifted from a normal and naturally assumed position to place a finger against the wheel. This problem is especially apparent to persons having small hands, and results in the hands being in an unnatural and strained position when focusing is required. Due to this awkward positioning, many users have considerable difficulty in holding the binoculars steady during adjustment when the need for stable support is most acute.

A more subtle and often unrecognized problem with conventional focus adjustments arises from the inherent tendency of the human eye to accommodate itself to an out-of-focus image. When the retina of the eye receives a de-focused image of a scene viewed through an optical device, the crystalline lens (the focusing element of the eye) is distorted out of its normal shape by the ciliary muscles of the eye to bring the retinal image into focus. When the de-focused optical device is removed from the field of view of the eye, the ciliary muscles relax and the crystalline lens reverts to its normal shape.

When the user focuses conventional binoculars of either the center-focus or individual-focus type, a considerable rotation of the adjustment wheel or rings is usually required, and the adjustment is so slow that the "accommodation" tendency of the eye comes into play. That is, an initially out-of-focus image will cause the ciliary muscles to distort the crystalline lens of the eye, and the user will eventually achieve a focus setting producing a de-focused image which is corrected by distortion of the crystalline lens. When the binoculars are removed from the eyes for a short period (sufficient for the crystalline lens to revert to a relaxed shape) and then again used to view an object thought to be in focus, it will be found that the image is initially de-focused, and another focus adjustment is required. Several attempts may be required before perfect focus is finally achieved.

The solution to this problem is to provide a focus adjustment capable of rapid actuation such that true focus is achieved before the accommodation tendency can manifest itself. The focus adjustment should be conveniently located and operable by a single short stroke such that rapid and comfortable actuation is possible. The binocular of this invention achieves these goals by incorporating a focus ring around an ocular-lens housing and having a conveniently located knob which is actuable through a short range of rotation to permit rapid focusing. The invention is not restricted to a focusing ring which is adapted to move the ocular lens, and the inventive concept is useful in monocular telescopes and in the positioning of other optical-system components such as an objective lens.

SUMMARY OF THE INVENTION

The invention relates to an improved focusing system for an optical telescope having a housing and an optical system mounted in the housing. The optical system has an optical axis, and includes an element which is movable over a focusing range sufficient to focus the telescope on near and distant objects. The focusing system includ s a focusing member mounted on a housing to be rotatable about the optical axis, and means coupled between the focusing member and the focusing element, the means being arranged to move the element through the full focusing range when the focusing member is rotated through no more than about 120 degrees.

In one form, the focusing element is an ocular lens mounted to be movable along the optical axis of the telescope, and the focusing member is a ring disposed adjacent the ocular lens and rotatable about the housing. A knob is secured to and extends downwardly from the ring to be positioned under the thumb of the user when the binoculars are held. In a presently preferred form, the coupling means defines a cam slot extending partially around and parallel to the optical axis, and further includes a cam-follower pin engaged in the slot and arranged whereby rotary motion of the ring is transmitted through the pin and cam slot to cause axial movement of the ocular lens along the optical axis for focusing.

The invention finds particular utility in binoculars having first and second spaced-apart telescopes and a bracket coupled to and securing together the telescopes. Each telescope has an optical system with an optical axis and a focusing element movable to focus the telescope on objects at varying ranges. In this form, the improved focusing system has a focusing member (such as an ocular lens) mounted on the first telescope to be rotatable about the optical axis of the first telescope. Coupling means are connected between the focusing member and the focusing element of the first telescope for moving the focusing element to focus the first telescope when the focusing member is rotated. A synchronizing means such as a bridge member is coupled between the focusing elements in the first and second telescopes to connect these elements so they move together as the focusing member is rotated whereby the two telescopes are focused simultaneously. The focusing member is preferably arranged so no more than 120 degrees of rotation is required to move each focusing element through its full focusing range.

Preferably, a locking means is used in conjunction with the optical instrument on which the improved focusing system is installed. The locking means is mounted on the focusing member, and is selectably engageable with a body portion of the instrument to provide increased resistance to movement of the focusing member whereby accidental displacement of a desired focus setting is avoided.

BRIEF DESCRIPTION OF THE DRAWINGS

The invention will be described in detail with reference to the attached drawings, in which:

FIG. 5 is a reduced-scale elevation of a binocular incorporating a modified form of the invention;

FIG. 6 is a sectional plan view of a binocular eyepiece taken on line 6—6 of FIG. 5;

FIG. 7 is a sectional elevation of the eyepiece taken on line 7—7 of FIG. 6;

FIG. 12 is a plan view of a portion of a binocular having a focusing ring with a locking means;

FIG. 13 is a sectional plan view of the locking means shown in FIG. 12;

FIG. 14 is a sectional plan view of another form of locking means for a focusing ring;

FIG. 15 is an elevation of the locking means shown in FIG. 14; and

FIG. 16 is a plan view of a compact binocular constructed according to the invention.

DESCRIPTION OF THE PREFERRED EMBODIMENTS

Figure 1:
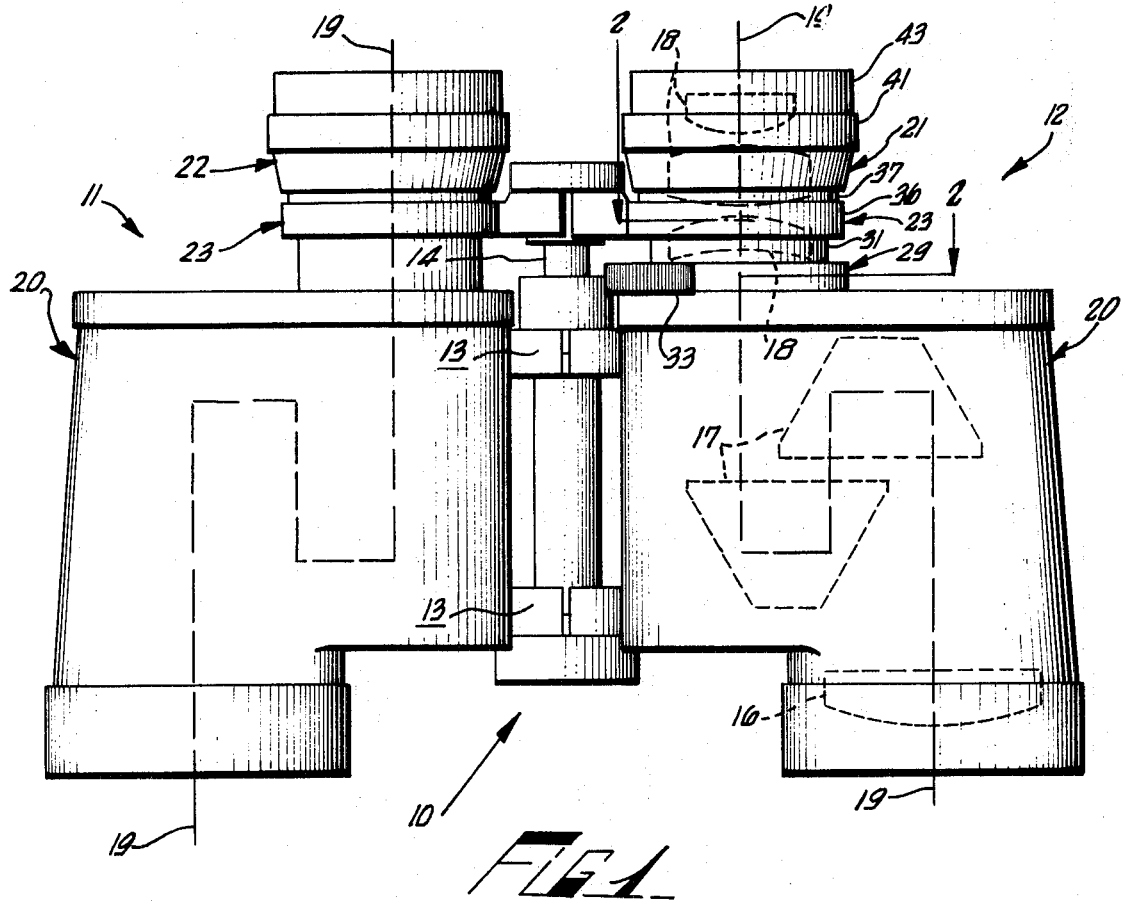
FIG. 1 is a plan view of a binocular constructed according to the invention.

A preferred form of a binocular 10 constructed according to the invention is shown in FIGS. 1–4. Referring to FIG. 1, the binocular includes a pair of spaced-apart monoculars or telescopes 11 and 12 which are secured together by a conventional hinged bracket 13 having a central pivot pin 14. The monoculars or telescopes are movable with respect to each other about a pivot axis defined by pivot pin 14 in order to provide an inter-pupillary-spacing adjustment for the binocular. This style of construction is conventional in almost all modern binoculars, and, for brevity, will not be described in detail.

The two telescopes incorporate substantially identical optical systems which are shown in phantom in telescope 12 and are of a conventional type. Each optical system includes an objective lens 16, a pair of prisms 17, and a set of ocular lenses 18 forming an eyepiece for the telescope. The prisms may be replaced by mirrors or other reflecting surfaces which serve the usual function of folding the optical path of the lens system such that lenses of relatively long focal length can be used in a compact instrument. An optical axis 19 for each telescope is shown by a pair of dashed lines in FIG. 1. The objective lens and prisms are secured in an objective body or housing 20, and the ocular lenses are mounted in an ocular or eyepiece housing 21 on telescope 12 and an ocular housing 22 on telescope 11.

A portion of each ocular housing is movable for focusing purposes with respect to the associated objective housing, and the movable portions are secured together by a bridge member 23. The bridge member is centrally hinged in the same fashion as bracket 13, and the bridge member engages pivot pin 14 so the two eyepieces or ocular housings are movable toward and away from each other around the pivot pin to provide an inter-pupillary-spacing adjustment for the binocular. The bridge member secures the movable portions of the two ocular systems together so they move as a unit during focusing of the binocular.

Figure 2:
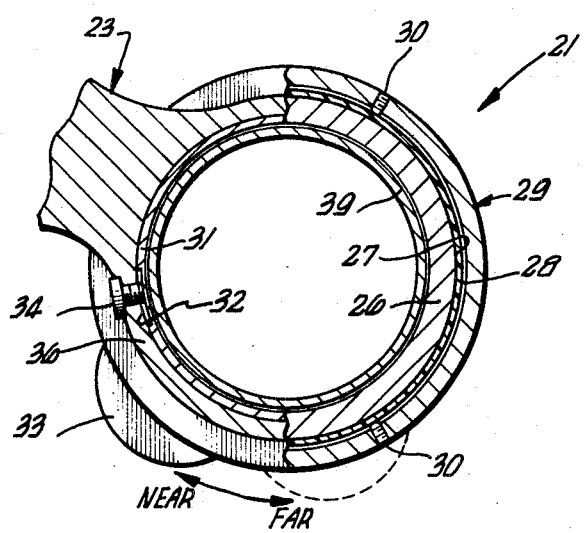
FIG. 2 is a stepped sectional elevation taken on line 2—2 of FIG. 1.
Figure 3:
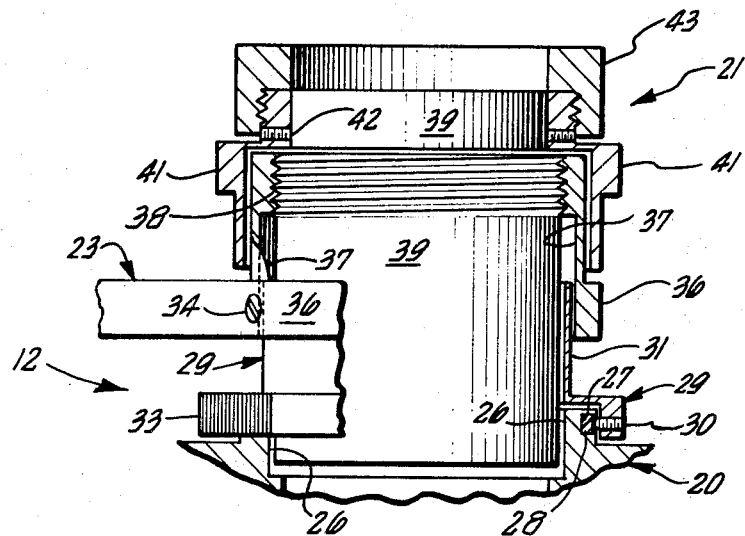
FIG. 3 is a sectional plan view of an eyepiece or ocular-lens portion of the binocular shown in FIG. 1.

The ocular housing of telescope 12 is shown in detail in FIGS. 2 and 3. The housing includes an annular flange 26 which is integral with and extends outwardly away from objective housing 20. An annular groove 27 is formed in the outer surface of flange 26, and a ring 28 of a plastic such as polytetrafluoroethylene (marketed under the trademark "Teflon") or a similar material is seated in the groove. A focusing ring 29 is seated over flange 26, and is secured in place by a plurality of dog-point setscrews 30 which are threaded through the focus ring to bear on plastic ring 28.

As shown in FIG. 3, the points of the setscrews fit between the walls of groove 27 to prevent the focusing ring from moving axially away from flange 26. The pressure of the setscrews on plastic ring 28 is adjusted until the focusing ring can be rotated relatively freely around flange 26, but with sufficient frictional drag that the position of the focusing ring on the flange is not upset by ordinary vibration or movement as the binoculars are used. As best seen in the cross-sectional view in FIG. 3, focusing ring 29 extends radially inwardly over the top of annular flange 26, and then extends axially outwardly away from the annular flange to define a hollow shell 31. The hollow shell has an inner surface which is aligned with the inner surface of flange 26.

Figure 4:
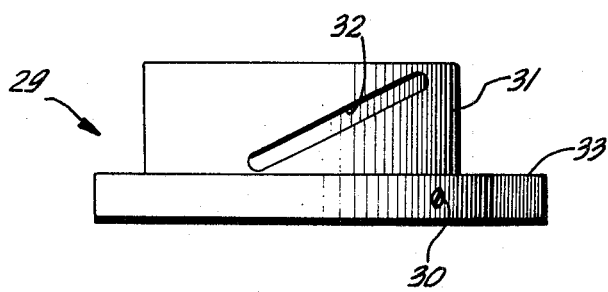
FIG. 4 is a plan view of a focusing ring.

A cam slot 32, best seen in FIG. 4, is cut into the outer surface of hollow shell 31 of the focusing ring. Preferably, the cam slot is formed as a recess in the hollow shell, rather than being cut entirely through the shell. The recessed construction eliminates an aperture in the shell through which dust or moisture could penetrate into the ocular housing. The cam slot extends partially around the optical axis of the ocular system of telescope 12, and also extends away or advances from the objective housing in a direction parallel to the optical axis. A knurled adjusting knob 33 is integral with and extends outwardly from the portion of the focusing ring which seats over flange 26.

Bridge member 23 defines a hollow collar 36 which surrounds and makes a slip fit over hollow shell 31 of the focusing ring. A dog-point setscrew 34 is threaded through collar 36 to seat in cam slot 32 as best seen in FIG. 2.

An annular flange 37 is integrally formed with and extends axially outwardly from hollow collar 36. An outer end of flange 37 carries internal threads 38, and a cylindrical ocular cell 39 is screwed into the threads to be supported by flange 37. The ocular cell includes conventional internal mounts (not shown) for securing in place the several ocular lenses shown in phantom in FIG. 1.

An individual-eyepiece focusing ring 41 fits loosely over annular flange 37 of the bridge-member collar, and extends radially inwardly above the outer end of flange 37 to fit snugly against the periphery of the outer end of ocular cell 39. Ring 41 is rigidly secured to the ocular cell by a plurality of setscrews 42 which are threaded through the ring to bear against the ocular cell. A hollow cap 43 is threaded over the outer end of ring 41.

In operation, the binoculars are first adjusted to match the interpupillary spacing of the user's eyes by adjusting hinged bracket 13 until the two eyepieces have the proper lateral spacing. An object is then viewed through the binoculars, and focus ring 29 is rotated until the magnified image of the object is in sharp focus. Any dioptric difference between the user's eyes is corrected by rotating individual focus ring 41 until the image in both telescopes is in sharp focus. The individual-eyepiece adjustment need normally only be made once by any one user of the binocular, as the adjustment remains constant when viewing both near and distant objects.

When focusing ring 29 is rotated, a relative displacement is forced to occur between bridge member 23 and the focusing ring because the inner end of dog-point screw 34 (which is secured to collar 36 of the bridge member) is constrained to follow cam slot 32. Focusing ring 29 cannot move axially as it is secured against such motion by setscrews 30 which are captive within groove 27 in annular flange 26. The bridge member is therefore forced to move toward or away from the focusing ring as this ring is rotated. This axial motion of the bridge member in turn results in an axial motion of the ocular cell as these components are secured together. This axial motion is simultaneously transmitted by the bridge member to ocular housing 22 (which has a conventional freely movable portion for focusing) in telescope 11, and the movable portions of the two ocular housings thus move cynchronously when the focusing ring 29 is rotated.

As suggested in FIG. 2, a counterclockwise rotation of about sixty to seventy degrees is sufficient to drive the ocular lenses through a full focusing range adequate to provide sharp images of objects at distances ranging from the near foreground to infinity. The term "near foreground" or "near objects" is used herein as referring to relatively close objects in the range of say eight to about twenty-five feet from the viewer. The exact near focusing limit will vary somewhat depending upon the focal length of the lenses used in the binocular, but is normally not less than about eight feet since most users are unable to fuse the two images of objects closer than this minimum distance.

The amount of rotation of focusing ring 29 required to cover the full focusing range of the binocular is determined by the pitch or steepness of cam slot 32. A short rotational stroke of about seventy degrees is preferred and provides adequate adjustment sensitivity which would not be available from a very short stroke of say ten degrees. The stroke should not exceed about 120 degrees in order to avoid requiring the user to reposition his finger on the knob of the focusing ring in order to make a complete rotational stroke.

Knob 33 of the focusing ring is preferably arranged to fall directly under the thumb of the user as the binoculars are held. This arrangement permits natural and comfortable focusing without requiring any shifting of the hands from their normal position on the binoculars. The knob, however, can also be located on top of the ocular housing for actuation by an index finger of the user.

Placement of the focusing ring to be rotatable about the ocular housing and around the optical axis of the ocular-lens system permits comfortable and natural adjustment of the focus setting. The short stroke of the focus ring to move the ocular lenses through the full focusing range permits very rapid focusing, and the "accommodation" tendency of the crystalline lens of the eye as discussed above is thereby avoided. The focusing action is so quick and simple that even moving objects such as birds can be maintained in constant focus as they move toward or away from the viewer.

The coupling means which is interposed between the focusing ring and the optical focusing element in the telescope can take a number of different forms. It is only necessary to provide a linkage capable of converting the rotational displacement of the focusing ring into a linear or other displacement of the optical element such that focusing is achieved. For example, the cam mechanism discussed above can be replaced by a conventional multiple-lead thread for securing together the movable and fixed portions of the ocular housing. Such threads are "steep," and have the characteristic that a relatively small rotation reduces a considerable linear displacement of the coupled parts.

Another form of a binocular 50 constructed according to the invention and incorporating a modified form of cam coupling means is shown in FIGS. 5–8. Binocular 50 includes first and second telescopes 51 and 52 which are pivotally secured together by a hinged bracket 53 in the same manner as described above in connection with binocular 10. Telescope 51, which incorporates the quick-focusing mechanism of the invention, includes an objective housing 54 and an ocular housing 55 as shown in detail in FIGS. 6–7. A bridge member 56 is mounted on the hinged bracket, and couples together the ocular housings of the two telescopes in the same fashion as described above with respect to binocular 10.

Figure 8:
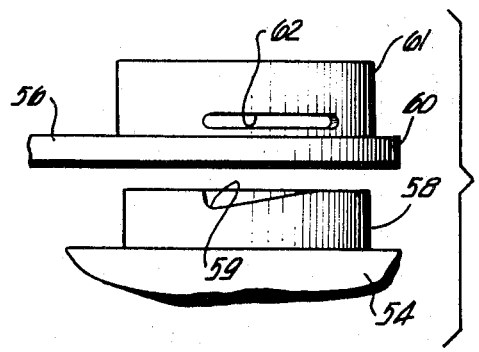
FIG. 8 is an exploded plan view of a portion of a bridge member and binocular body as used in the binocular of FIGS. 5-7, the view being generally taken on line 8–8 of FIG. 7.

The ocular housing includes an annular flange 58 which is integral with and extends axially outwardly from objective housing 54. As best seen in FIG. 8, this hollow flange has an inclined clearance groove 59 formed in its outer end along a portion of the diameter of the flange. Bridge member 56 has a hollow collar 60 which makes a slip fit over annular flange 58. A ring-shaped flange 61 extends axially outwardly from the hollow collar around flange 58, and an outer end of flange 61 extends radially inwardly over the outer end of flange 58. As best seen in FIG. 8, an elongated slot 62 is formed through flange 61, and the slot is perpendicular to an optical axis 63 of the lenses in the ocular housing.

A cylindrical ocular cell 65 makes a slip fit within flange 58, and includes a radially outwardly extending shoulder 65A which abuts the end of flange 61. The ocular cell includes the usual ocular lenses (not shown) as described above. A round hollow cap 66 fits over the outer end of the ocular cell, and makes a snug fit over the outer surface of flange 61. A plurality of setscrews 67 are threaded through the cap into recesses in the outer end of flange 61 to secure the cap rigidly to the flange. A lock ring 68 is threaded into the outer end of cap 66 to secure the ocular cell in place.

A focusing member or ring 71 makes a rotatable slip fit over the periphery of flange 61, and includes a radially extending knob 72. A dog-point setscrew 73 is threaded through the knob and focusing ring to extend through slot 62 and seat in a recess 74 in the periphery of the ocular cell. A second dog-point setscrew 75 is threaded through flange 58 to seat in an elongated cam slot 76 formed in the outer surface of ocular cell 65. Both recess 74 and cam slot 76 are preferably formed as depressions in the surface of the ocular cell, and do not extend completely through the wall of the cell in order to avoid the entry of moisture or dust into the ocular-lens system.

In operation, binoculars 50 are focused by rotating focusing ring 71 until the images in both telescopes are in sharp focus. The focusing ring and ocular cell rotate as a unit as these two components are coupled together by screw 73 which is seated in recess 74. As the cell is rotated, it is forced to move axially as cam slot 76 follows the point of setscrew 75 which is rigidly secured to flange 58. This axial focusing motion is transmitted to the ocular system of second telescope 52 by bridge member 56 which moves axially with the focusing ring and ocular cell because the shaft of screw 73 is constrained within elongated slot 62 in flange 61 of the bridge member. Groove 59 in the upper end of flange 58 provides clearance for the shaft of screw 73 as it rotates and moves axially as a result of rotation of the focusing ring.

The overall operation of this focusing system is quite similar to the operation of binocular 10 with the exception that the focusing ring incorporated in binocular 50 moves both axially and rotationally, whereas the focusing ring of binocular 10 is axially fixed. The eyepiece of telescope 52 is made adjustable in conventional fashion to provide a correction for any dioptric difference between the eyes of the user.

Figure 9:
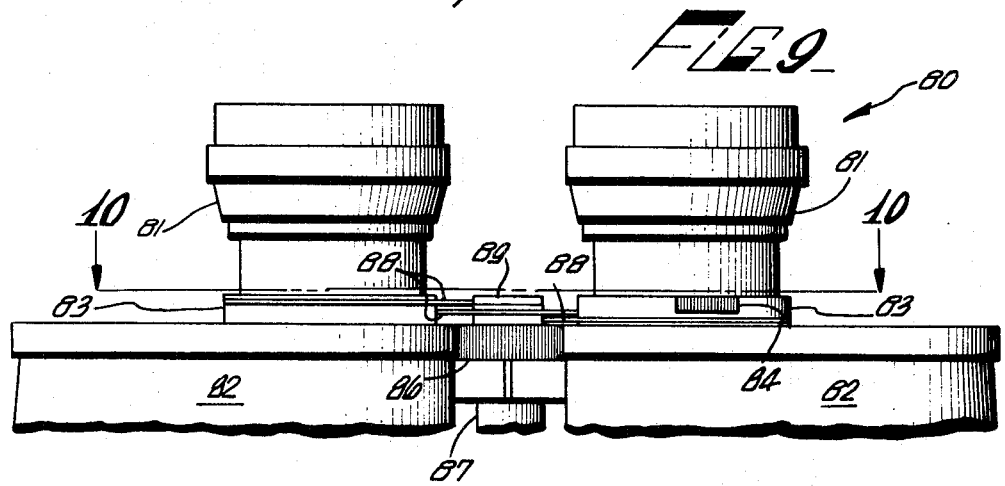
FIG. 9 is a plan view of another form of a binocular constructed according to the invention.

It may sometimes be desirable to incorporate both center focusing and ocular-ring focusing in a single binocular. Such an arrangement is shown in FIG. 9 in which a binocular 80 has a pair of ocular-lens housing 81 mounted in a pair of associated objective-lens housing 82. Both of the ocular-lens housings include a rotatable focusing ring 83, and each ring is arranged such that rotation thereof results in axial motion of the associated ocular-lens housing toward and away from the objective-lens housings. The linkage to accomplish this motion can be of the cam type as described above in connection with binoculars 10 and 50, or a multiple-lead thread can be provided between the focusing rings and the ocular-lens housings. A focusing knob 84 is provided on one of the focusing rings.

Figure 10:
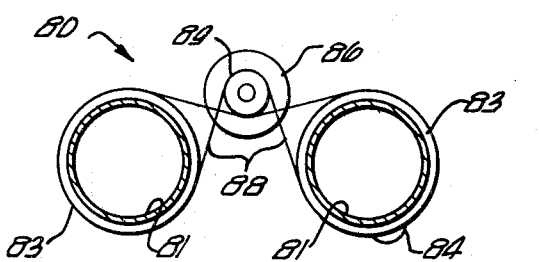
FIG. 10 is a schematic elevation, partly in section, of the binocular shown in FIG. 9.

A center focusing wheel 86 is rotatably mounted on a pivot pin 87 which extends through the usual hinged brackets used to secure together the two objective-lens housings. A flexible drive belt 88 is looped around the two focusing rings, and passed over a pulley 89 which is integrally formed on an outer face of the pulley. In order to obtain adequate friction between the belt and the pulley, the belt may make one or more complete wraps around the pulley. The path of the flexible drive belt is most easily seen in FIG. 10 in which the components of binocular 80 are shown in schematic form.

Figure 11:
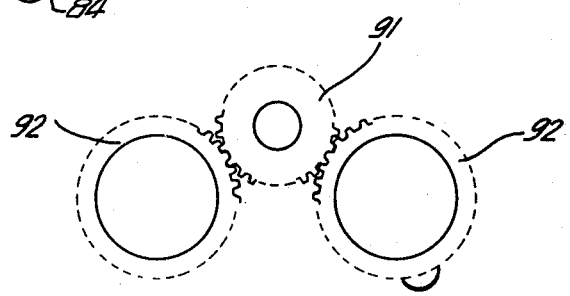
FIG. 11 is a schematic elevation of a modified form of the binocular shown in FIG. 9.

Rotation of either of the focusing rings or the center focusing wheel is transmitted by the flexible drive belt to the other rotatable components in the binocular. The resulting rotation of the two focusing rings causes simultaneous axial motion of the two ocular-lens housings, and focusing of the binocular is thereby achieved. The drive belt can of course be replaced by gears or some other synchronizing means, and this arrangement is suggested in schematic form in FIG. 11. In this modification, a center focusing wheel 91 has gear teeth around its periphery, and a pair of focusing rings 92 on the ocular housings of the binoculars similarly have gear teeth around their outer surfaces which mesh with the teeth on wheel 91.

Another feature of the invention is to provide a locking means on the focusing member or ring to prevent inadvertent loss of a desired focus setting when the binoculars are jostled during carrying, or are otherwise subjected to vibration or shock. One form of a suitable locking means 100 is shown in FIGS. 12–13, and is installed on a focusing ring 29A which is similar to focusing ring 29 described above with the exception that knob 33 has been replaced by the locking means. An actuating knob 101 is mounted in a recess 102 (shown in phantom in FIG. 13) in the periphery of the focusing ring. The knob is pivotally secured to the focusing ring by a pin 103.

A lock shaft 105 is pivotally secured to knob 101 by a pin 106, and the shaft extends through an opening in focusing ring 29A to abut plastic ring 28 on annular flange 26. An annular flange 107 is integrally formed on and extends radially from an inner portion of lock shaft 105. A circular recess 108 is formed in the inner surface of the focusing ring to provide clearance for axial movement of annular flange 107. A C-shaped spring 109 is positioned between the outer face of annular flange 107 and the bottom of circular recess 108, and the spring urges the lock shaft toward plastic ring 28.

Spring 109 is selected to have sufficient force that the frictional engagement of the inner end of the lock shaft and the plastic ring is adequate to prevent inadvertent rotation of the focusing ring. When a change in the focus setting is desired, actuating knob 101 is depressed (as indicated by arrow 110 in FIG. 13) to retract the lock shaft away from the plastic ring. The focusing ring is then easily rotatable, and the actuating knob is held in a depressed position until a desired focus setting is achieved. C-shaped spring 109 can of course be replaced by a coil spring or any other suitable resilient means having sufficient restoring force to urge the lock shaft against the plastic ring with the desired pressure.

Another suitable form of a lock means 115 is shown in FIGS. 14–15. This mechanism is again shown on a slightly modified form of a focusing ring 29B which is generally similar to focusing ring 29 described above. The focusing ring has a knob 116, and a slot 117 is cut through the knob to provide clearance for a knurled wheel 118. An integral shaft 119 is integrally formed with and extends from both faces of wheel 118, and the inner portion of the shaft is threaded through focusing ring 29B. The inner end of the shaft bears on plastic ring 28 on annular flange 26 in the same fashion as lock shaft 105 as described above. The lock is engaged or released simply by rotating the knurled wheel to move the inner end of the shaft into or out of engagement with the plastic ring.

FIG. 16 shows a compact binocular 130 in which a pair of objective-lens housings 131 are positioned more closely together than a cooperating pair of ocular-lens housings 132. Lines 133 indicate the optical axes of the two telescope systems of the binocular. This style of binocular is especially suitable for hunters or for use in the theater where a pocket-size instrument is desired.

The objective-lens housings have movable portions 134 and 135 which are coupled together by a synchronizing means such as a bridge member 136 which forces the movable portions to move together along the optical axes. The two telescopes are secured together by the usual hinged bracket as described above. A focusing knob 137 is secured to ring-shaped movable portion 134, and this portion is coupled to a fixed flange 138 on the associated telescope body by a cam linkage (not shown) in the same fashion as described above for binocular 50. Alternatively, the objective-lens housing can be made adjustable using the mechanisms described above for binocular 10.

A short-stroke rotation of the focusing knob drives movable portion 134 (and the associated objective lens) through a full focusing range, and movable portion 135 follows or tracks this motion which is transmitted by the bridge member. The knob can be positioned on top of the objective-lens housing for actuation by the ring finger, or beneath this housing for actuation by the thumb.

There has been described a rapid-focusing apparatus for binoculars and other instruments. The apparatus permits confortable and quick adjustment of optical instruments without any necessity for shifting the position of the user's hands on the instrument. The rapidity with which the focusing adjustment is achieved overcomes the eye-accommodation problem discussed above, and therefore assures accurate adjustment and freedom from eyestrain when the instrument is in use.

While the invention has been described in terms of its application to a binocular, it is to be understood that the concepts of the invention are equally applicable to other instruments such as telescopes. The invention is also not limited to the adjustment of an ocular or objective lens, and the various linkages described above are easily adapted to vary the position of a negative lens or some other focusing element in the optical system. For example, it is often practical to provide a focus adjustment by shifting the position of prisms or mirrors used in the system, and the mechanism of the invention is quite suitable for this purpose. These and other modifications of the preferred forms of the invention discussed above will suggest themselves to those skilled in the art, and all such variations are intended to be encompassed within the scope of the following claims which define the invention.

I claim:

1. In an optical binocular having a telescope with a housing supporting an optical system which includes an ocular lens movable over a focusing range to focus the telescope on near and distant objects, an improved focusing system comprising:

a focusing ring movably mounted on the housing to be rotatable with respect to the housing about an axis parallel to an optical axis of the ocular lens;

a knob secured to and extending radially outwardly from the focusing ring, the knob being disposed for single-finger operation without hand repositioning by a user; and drive means positioned between the focusing ring and the ocular lens for moving the ocular lens through the full focusing range when the ring is rotated no more than about 70 degrees, the drive means defining a cam slot extending partially around the optical axis, the means further having a cam-follower pin in the slot so rotary motion of the ring is transmitted through the pin and cam slot to cause movement of the element along the optical axis for focusing the motion of the ring being limited by the cam slot and pin.

2. The combination defined in claim 1 in which the binocular includes a second telescope having a second ocular lens movable over the focusing range to focus the second telescope on near and distant objects, and further comprising synchronizing means coupled between the telescopes and connecting the ocular lenses to move together as the focusing ring is rotated whereby the two telescopes are focused simultaneously.

References Cited

UNITED STATES PATENTS

| | | | |
|---|---|---|---|
| 802,817 | 10/1905 | Lloyd | 350—76 |
| 1,480,990 | 1/1924 | Brueck | 350—79 |
| 2,602,371 | 7/1952 | Harford | 350—76 |
| 2,988,955 | 6/1961 | Goto et al. | 350—77 |
| 3,312,518 | 4/1967 | Bushnell | 350—36 |
| 1,482,881 | 2/1924 | Berggren | 350—77 |
| 3,095,750 | 7/1963 | Mahn | 350—187 XR |
| 590,549 | 9/1897 | King et al. | 350—77 |

FOREIGN PATENTS

| | | |
|---|---|---|
| 6,656 | 3/1902 | Great Britain. |
| 877,934 | 9/1961 | Great Britain. |
| 269,445 | 1/1914 | Germany. |
| 4,701 | 2/1904 | Great Britain. |

PAUL R. GILLIAM, Primary Examiner

U.S. Cl. X.R.

350—44